United States Patent [19]
Matsui et al.

[11] Patent Number: 4,816,349
[45] Date of Patent: Mar. 28, 1989

[54] ZIRCONIA-COATED SILICON NITRIDE SINTERED MEMBER

[75] Inventors: Minoru Matsui, Nagoya; Tomonori Takahashi, Chita, both of Japan

[73] Assignee: NGK Insulators, Ltd., Nagoya, Japan

[21] Appl. No.: 112,053

[22] Filed: Oct. 22, 1987

Related U.S. Application Data

[63] Continuation of Ser. No. 887,654, Jul. 21, 1986, abandoned.

[30] Foreign Application Priority Data

Aug. 2, 1985 [JP] Japan .................................. 60-169792
Sep. 26, 1985 [JP] Japan .................................. 60-213493

[51] Int. Cl.$^4$ .............................................. B32B 13/04
[52] U.S. Cl. ...................................... 428/698; 428/699
[58] Field of Search ................. 427/309; 428/698, 699, 428/469, 688

[56] References Cited

U.S. PATENT DOCUMENTS

| | | |
|---|---|---|
| 2,707,691 | 3/1955 | Wheildon, Jr. . |
| 2,876,121 | 3/1959 | Ault . |
| 3,953,636 | 4/1976 | Kirchner .......................... 428/698 X |
| 3,977,061 | 8/1976 | Lindstrom et al. .............. 428/698 X |
| 4,055,705 | 10/1977 | Stecura et al. . |
| 4,109,050 | 8/1978 | Mehan et al. ................... 428/336 X |
| 4,226,914 | 10/1980 | Terner et al. . |
| 4,288,495 | 9/1981 | Terner et al. . |
| 4,310,481 | 1/1982 | Baney . |
| 4,357,382 | 11/1982 | Lambert et al. ................ 428/698 X |
| 4,409,003 | 10/1983 | Sarin et al. . |
| 4,424,096 | 1/1984 | Kumagai . |
| 4,515,860 | 5/1985 | Holzl . |
| 4,608,326 | 8/1986 | Neukermans et al. . |
| 4,634,635 | 1/1987 | Shiraishi et al. . |

FOREIGN PATENT DOCUMENTS

| | | |
|---|---|---|
| 1058422 | 11/1957 | Fed. Rep. of Germany . |
| 57515178 | 6/1977 | Japan . |
| 56-155080 | 8/1980 | Japan . |
| 60-224783 | 11/1985 | Japan . |
| 1560793 | 5/1976 | United Kingdom . |

OTHER PUBLICATIONS

Hawley, Condensed Chemical Dictionary, 9th ed., p. 945.

Primary Examiner—Nancy A. B. Swisher
Attorney, Agent, or Firm—Parkhurst, Oliff & Berridge

[57] ABSTRACT

A silicon nitride sintered member comprises a silicon nitride sintered body and a zirconia layer coated onto the surface of the silicon nitride sintered body. The zirconia layer is preferably coated onto the surface of the silicon nitride sintered body through plasma spraying. The zirconia-coated silicon nitride sintered member has both high strength at high temperatures and excellent heat insulating property.

14 Claims, No Drawings

ZIRCONIA-COATED SILICON NITRIDE SINTERED MEMBER

This is a continuation of application Ser. No. 887,654, filed July 21, 1986, now abandoned.

BACKGROUND OF THE INVENTION

1. Field of the Invention

The present invention relates to a silicon nitride sintered member having an excellent heat insulating property. More specifically, the invention relates to a silicon nitride sintered member having the surface coated with zirconia and a low thermal conductivity near the surface.

2. Related Art Statement

Since silicon nitride sintered members are more excellent than other inorganic materials or metals in terms of mechanical strength, thermal resistance, thermal shock resistance, corrosion resistance, etc. at high temperatures, its uses as high temperature structural members have been examined, and the uses has actively been being developed.

However, the silicon nitride sintered members have a shortcoming that it has a high thermal conductivity and therefore it is poor in heat insulating property. For instance, when a silicon nitride sintered member is used at a wall face of an engine combustion chamber to enhance the thermal resistance, heat insulation to the exterior can be improved by an air gap, etc, but proper intake gas density can not be obtained because the thermal conductivity is high and therefore intake gas is warmed. In that case, the high thermal conductivity near the surface of the silicon nitride sintered member comes into a problem.

It is disclosed in Japanese patent application laid-open Nos. sho 55-28,351, 57-140,876 and 58-87,273 that the surface of a metal substrate is coated with zirconia through plasma spraying, aiming at the improvement of thermal resistance, corrosion resistance and wear resistance. Further, Japanese patent application laid-open Nos. sho 57-135,771 and 58-125,679 that the surface of a substrate of carbon is coated with zirconia. In such a technique, a cermet, platinum or Ni base alloy is used as an intermediate layer for strengthening a bonding force of the zirconia layer. However, there has been no idea that a silicon nitride sintered body is used as a substrate and the thermal insulation near the surface thereof is intended to be improved.

As compared with the silicon nitride sintered body, zirconia has a lower thermal conductivity and a more excellent thermal insulation property, but it has a defect that it is lower in mechanical strength at high temperatures.

SUMMARY OF THE INVENTION

The present invention is aimed at solving the above-mentioned drawbacks, and is to provide a silicon nitride sintered member the surface of which is coated with zirconia as a heat insulating layer.

According to the present invention, the surface of the silicon nitride sintered body which has high strength at high temperatures but high thermal conductivity and poor heat insulating property is coated with zirconia having a low thermal conductivity, thereby improving the heat insulating property near the surface of the silicon nitride sintered member.

The zirconia-coated silicon nitride sintered member according to the present invention has both high strength at high temperatures and excellent heat insulating property.

These and other objects, features and advantages of the invention will be well appreciated upon reading of the following description of the invention with understanding that some modifications, variations and changes of the same could be made by a skilled person in the art to which the invention pertains without departing from the spirit of the invention or the scope of claims appended hereto.

DETAILED DESCRIPTION OF THE INVENTION

The silicon nitride sintered member used in this application means structural members, such as engine parts, made of a silicon nitride pressureless sintered body, a hot press sintered body, an HIP sintered body or a reaction sintered body. Although the silicon nitride sintered member may contain various additives such as MgO, $Al_2O_3$ or $Y_2O_3$, the additives have not essential importance in improving thermal insulating property of the silicon nitride sintered body. The present invention is characterized in that the surface of the silicon nitride sintered member is coated with zirconia.

As zirconia, use may be made of zirconia which is stabilized or partially stabilized with $Y_2O_3$, MgO or CaO. The thickness of the zirconia layer is preferably not more than 100 $\mu$m. This is partially because when the thickness of the zirconia layer is too large, peeling or penetration is likely to occur through repetition of heating and cooling due to difference in coefficient of thermal expansion between the silicon nitride sintered body and zirconia and partially because even the 100 $\mu$m or less thickness is sufficient to effectively reduce thermal conductivity near the surface of the silicon nitride sintered member.

Next, the method of producing the silicon nitride sintered member having the surface coated with zirconia according to the present invention will be explained below.

The silicon nitride sintered member the surface of which is coated with zirconia is a silicon nitride sintered member the whole or partial surface of which is coated with zirconia by applying or spraying a zirconia slurry onto the surface of a silicon nitride sintered body to form a zirconia-coated layer, followed by firing, or preferably by coating zirconia onto the surface of the silicon nitride sintered body through plasma spraying.

The surface of the silicon nitride sintered body is generally a fired surface or a machined surface. Thus, in order to increase the bonding force between the zirconia slurry-applied layer or plasma sprayed layer and the surface of the silicon nitride sintered body, it is necessary to perform the surface treatment for roughening or activation. For instance, these treatments are polishing with abrasive grits, oxidizing under heating in air, etching with fluoric acid, etc. An optimum method needs to be discovered as the surface treatment for roughening and activation depending upon the quality of the silicon nitride sintered body. Then, zirconia is coated on or plasma sprayed onto the surface of the silicon nitride sintered body having undergone the above surface treatment. In this case, as a zirconia coating raw material or a zirconia plasma spraying raw material, use may be made of stabilized or partially stabilized zirconia. Alternatively, stabilized or partially stabilized zirconia may be formed by reacting zirconia and a stabilizer during firing or plasma spraying. An intermediate layer having an intermediate coefficient of thermal expansion may be preliminarily formed on the surface of the silicon nitride sintered body so that the peeling and penetration due to difference in coefficient of thermal expansion between the silicon nitride sintered body and the stabilized zirconia can not occur.

In the following, examples of the present invention will be shown. They are merely given in illustration thereof but should not be interpreted to limit the scope of the invention.

EXAMPLE 1

A disc of 10 mm in diameter and 3 mm thick machined from a silicon nitride pressureless sintered body containing SrO, MgO, $CeO_2$ and $ZrO_2$ as additive was oxidized at 1,200° C. in air for 24 hours to form an oxidized layer on the surface thereof, thereby obtaining a substrate to be plasma sprayed. A flame spraying agent in Table 1 was plasma sprayed onto one surface of the substrate in a thickness of 50 to 70 μm, thereby obtaining Samples 1, 2 and 3 of the silicon nitride sintered members according to the present invention which were to be subjected to the measurement of the thermal conductivity. The thermal conductivities of Samples 1, 2 and 3 and Comparative Example 4 in which a substrate was coated with no zirconia were measured at room temperature and at 800° C. according to a laser flash method, and results thereof are shown in Table 1. The measurement of the thermal conductivities of Samples 1, 2 and 3 according to the laser flash method was performed by irradiating the laser beams upon the coated surface.

TABLE 1

|  | Sample No. | flame-spraying agent | Thermal conductivity (cal/cm · sec · °C.) | |
|---|---|---|---|---|
|  |  |  | Room temperature | 800° C. |
| Present invention | 1 | 24 weight % MgO—$ZrO_2$ | 0.03 | 0.03 |
|  | 2 | 20 weight % $Y_2O_3$—$ZrO_2$ | 0.03 | 0.02 |
|  | 3 | 5 weight % CaO—$ZrO_2$ | 0.03 | 0.03 |
| Comparative Example | 4 | No coating | 0.07 | 0.05 |

Samples 1, 2 and 3 according to the present invention suffered no peeling or penetration even after repetition of heating and cooling between room temperature and 1,200° C. at 20 times.

EXAMPLE 2

A disc of 10 mm in diameter and 3 mm thick machined from a silicon nitride pressureless sintered body containing $Y_2O_3$, MgO and $CeO_2$ as an additive was immersed in conc. hydrofluoric acid at 50° C. for 1 hour to perform etching the surface thereof, thereby obtaining a substrate to be plasma sprayed. A flame spraying agent in Table 2 was plasma sprayed onto one surface of the substrate in a thickness of 50 to 70 μm, thereby obtaining Samples 5 and 6 of the silicon nitride sintered members according to the present invention to be used for the thermal conductivity measurement. The thermal conductivities of Samples 5 and 6 and Comparative Example 7 in which a substrate was coated with no zirconia were measured by the same method as in Example 1, and measurement results are shown in Table 2.

TABLE 2

|  | Sample No. | flame-spraying agent | Thermal conductivity (cal/cm · sec · °C.) | |
|---|---|---|---|---|
|  |  |  | Room temperature | 800° C. |
| Present invention | 5 | 24 weight % MgO—$ZrO_2$ | 0.03 | 0.02 |
|  | 6 | 20 weight % $Y_2O_3$—$ZrO_2$ | 0.03 | 0.02 |
| Comparative Example | 7 | No $ZrO_2$ coating | 0.07 | 0.04 |

Samples 5 and 6 according to the present invention suffered no peeling or penetration even after repetition of heating and cooling between room temperature and 1,200° C. at 20 times, either.

EXAMPLE 3

A disc of 10 mm in diameter and 3 mm thick machined from a silicon nitride hot press sintered body containing MgO as an additive was polished with #400 SiC abrasive grits to render the surface coarse, thereby obtaining a substrate to be slurry-applied. A slurry in which a slurry-applying agent in Table 3 and polyvinyl alcohol as a binder were suspended in water was applied onto one surface of the substrate, which was dried and heated at 1,500° C. in a nitrogen atmosphere for 1 hour to form a fired layer of 90–100 μm thick, thereby obtaining Samples 8 and 9 of the silicon nitride sintered members according to the present invention for the thermal conductivity measurement. The thermal conductivities of Samples 8 and 9 and Comparative Example 10 in which a substrate was coated with no zirconia were measured by the same method as in Example 1, and measurement results are shown in Table 3.

TABLE 3

|  | Sample No. | Slurry-applying agent | Thermal conductivity (cal/cm · sec · °C.) | |
|---|---|---|---|---|
|  |  |  | Room temperature | 800° C. |
| Present invention | 8 | 24 weight % MgO—$ZrO_2$ | 0.04 | 0.03 |
|  | 9 | 20 weight % $Y_2O_3$—$ZrO_2$ | 0.04 | 0.03 |
| Comparative Example | 10 | No $ZrO_2$ coating | 0.08 | 0.06 |

Samples 8 and 9 according to the present invention suffered no peeling or penetration even after repetition of heating and cooling between room temperature and 1,200° C. at 20 times.

As shown in Tables 1, 2 and 3, the silicon nitride sintered members according to the present invention in which the surface of substrate is coated with zirconia through plasma spraying or slurry-applying have low thermal conductivities and excellent heat insulating property.

As explained in the foregoing, the silicon nitride sintered member according to the present invention in which the surface of the substrate is coated with zirconia possesses both high temperature strength of the silicon nitride sintered body and the heat insulating property of zirconia in combination. Thus, the thermal resistance and the heat insulating property can be simultaneously improved by application of the silicon nitride sintered member as high temperature structural members for the engine parts.

What is claimed is:

1. A silicon nitride sintered member, consisting essentially of:
   a silicon nitride sintered body; and
   a heat insulating layer formed on a surface of said silicon nitride sintered body, said layer consisting essentially of zirconia and having a thickness of not greater than 100 microns;
   wherein said heat insulating layer reduces the thermal conductivity of said silicon nitride sintered member.

2. The silicon nitride sintered member according to claim 1, wherein said thickness is not greater than 70 microns.

3. The silicon nitride sintered member according to claim 1, further comprising an intermediate layer formed between said silicon nitride sintered body and said heat insulating layer, wherein said intermediate layer has a thermal expansion coefficient between that of the silicon nitride sintered body and that of the heat insulating layer.

4. The silicon nitride sintered member according to claim 1, wherein said silicon nitride sintered body further comprises additives selected from the group consisting of MgO, $Al_2O_3$, $Y_2O_3$, SrO, $CeO_2$ and $ZrO_2$.

5. The silicon nitride sintered member according to claim 1, wherein said zirconia is stabilized with at least one additive selected from the group consisting of $Y_2O_3$, MgO and CaO.

6. The silicon nitride sintered member according to claim 1, wherein said zirconia is partially stabilized with at least one additive selected from the group consisting of $Y_2O_3$, MgO and CaO.

7. The silicon nitride sintered member according to claim 1, further comprising a thermal conductivity of not greater than 0.04 Bcal/cm.sec.°C.

8. A silicon nitride sintered member, consisting essentially of:
   a silicon nitride sintered body; and
   a heat insulating layer formed on a roughened or activated surface of said silicon nitride body by plasma spraying, said layer consisting essentially of zirconia and having a thickness of not greater than 100 microns;
   wherein said heat insulating layer is rigidly adhered to said body, such that said layer reduces the thermal conductivity of said silicon nitride sintered member.

9. The silicon nitride sintered member according to claim 8, wherein said thickness is not greater than 70 microns.

10. The silicon nitride sintered member of claim 8, further comprising an intermediate layer formed between said silicon nitride sintered body and said heat insulating layer, wherein said intermediate layer has a thermal expansion coefficient between that of the silicon nitride sintered body and that of the heat insulating layer.

11. The silicon nitride sintered member according to claim 8, wherein said silicon nitride sintered body further comprises additives selected from the group consisting of MgO, $Al_2O_3$, $Y_2O_3$, SrO, $CeO_2$ and $ZrO_2$.

12. The silicon nitride sintered member according to claim 8, wherein said zirconia is stabilized with at least one additive selected from the group consisting of Yhd $2O_3$, MgO and CaO.

13. The silicon nitride sintered member according to claim 8, wherein said zirconia is partially stabilized with at least one additive selective from the group consisting of $Y_2O_3$, MgO and CaO.

14. The silicon nitride sintered member according to claim 8, further comprising a thermal conductivity of not greater than 0.04 cal/cm.sec.°C.

* * * * *